(12) United States Patent
Madura et al.

(10) Patent No.: US 10,055,718 B2
(45) Date of Patent: Aug. 21, 2018

(54) PURCHASE CONFIRMATION DATA EXTRACTION WITH MISSING DATA REPLACEMENT

(71) Applicant: Slice Technologies, Inc., San Mateo, CA (US)

(72) Inventors: Dennis Madura, San Francisco, CA (US); Bradford William Pflum, San Francisco, CA (US); Matthew Joseph Iannone, Foster City, CA (US); Juan Wang, Santa Clara, CA (US)

(73) Assignee: Slice Technologies, Inc., San Mateo, CA (US)

( * ) Notice: Subject to any disclaimer, the term of this patent is extended or adjusted under 35 U.S.C. 154(b) by 0 days.

(21) Appl. No.: 15/277,933

(22) Filed: Sep. 27, 2016

(65) Prior Publication Data

US 2017/0193465 A1    Jul. 6, 2017

Related U.S. Application Data

(60) Provisional application No. 62/358,289, filed on Jul. 5, 2016, provisional application No. 62/273,861, filed on Dec. 31, 2015.

(51) Int. Cl.
*G06Q 40/00*   (2012.01)
*G06Q 20/10*   (2012.01)
(Continued)

(52) U.S. Cl.
CPC ......... *G06Q 20/10* (2013.01); *G06F 17/3053* (2013.01); *G06F 17/30554* (2013.01); *G06Q 30/0625* (2013.01); *H04L 67/10* (2013.01)

(58) Field of Classification Search
CPC .................................................. G06Q 40/00
(Continued)

(56) References Cited

U.S. PATENT DOCUMENTS 7,082,426 B2    7/2006   Musgrove et al.
7,321,887 B2    1/2008   Dorner et al.
(Continued)

FOREIGN PATENT DOCUMENTS

JP    2002014681 A    1/2002
KR    1020140138512 A    12/2014
WO    2016064679 A1    4/2016

OTHER PUBLICATIONS

International Search Report dated Apr. 7, 2017 in counterpart International Application No. PCT /US2016/067305, filed Dec. 16, 2016.
(Continued)

*Primary Examiner* — Hai Tran
(74) *Attorney, Agent, or Firm* — Law Office of Edouard Garcia

(57) ABSTRACT

A server system automatically extracts sets of purchase transaction related data values for target purchase-related field types from purchase transaction records. The server system automatically flags respective ones of the sets of purchase transaction related data values with one or more respective incomplete purchase transaction related data values for one or more of the target purchase-related field types, and stores the flagged sets of purchase transaction related data values and ones of the other sets of purchase transaction related data values determined to be complete in a data storage system. For each of respective ones of the flagged sets of purchase transaction related data values, the server system unobtrusively recovers missing purchase transaction related information from one or more side channels based on one or more query terms and one or more query result selection criteria determined at least in part from the extracted purchase transaction related data values.

22 Claims, 6 Drawing Sheets

(51) Int. Cl.
*H04L 29/08* (2006.01)
*G06Q 30/06* (2012.01)
*G06F 17/30* (2006.01)

(58) Field of Classification Search
USPC .................................................. 705/35–45
See application file for complete search history.

(56) References Cited

U.S. PATENT DOCUMENTS

| | | | |
|---|---|---|---|
| 7,546,290 B2 | 6/2009 | Colando | |
| 7,685,276 B2 | 3/2010 | Konig et al. | |
| 7,783,515 B1 | 8/2010 | Kumar et al. | |
| 8,046,797 B2 | 10/2011 | Bentolila et al. | |
| 8,527,436 B2 | 9/2013 | Salaka et al. | |
| 8,744,948 B1 | 6/2014 | McVickar et al. | |
| 8,868,621 B2 | 10/2014 | Ray et al. | |
| 9,053,206 B2 | 6/2015 | Cai et al. | |
| 9,268,860 B2 | 2/2016 | Lee et al. | |
| 9,323,731 B1 | 4/2016 | Younes et al. | |
| 2002/0052847 A1 | 5/2002 | Shioda et al. | |
| 2002/0156817 A1* | 10/2002 | Lemus | G06F 17/30569 715/256 |
| 2002/0174185 A1 | 11/2002 | Rawat et al. | |
| 2003/0105681 A1 | 6/2003 | Oddo | |
| 2004/0117615 A1 | 6/2004 | Wilks | |
| 2004/0220926 A1 | 11/2004 | Lamkin et al. | |
| 2004/0230647 A1* | 11/2004 | Rawat | G06F 17/30899 709/203 |
| 2005/0055290 A1 | 3/2005 | Bross et al. | |
| 2007/0073592 A1 | 3/2007 | Perry et al. | |
| 2007/0198727 A1 | 8/2007 | Guan | |
| 2007/0250390 A1 | 10/2007 | Lee et al. | |
| 2008/0033831 A1 | 2/2008 | Boss et al. | |
| 2008/0098300 A1 | 4/2008 | Corrales et al. | |
| 2008/0306831 A1 | 12/2008 | Abraham | |
| 2008/0306968 A1 | 12/2008 | Nandhra | |
| 2009/0089209 A1 | 4/2009 | Bixler et al. | |
| 2009/0299887 A1 | 12/2009 | Shiran et al. | |
| 2010/0083095 A1 | 4/2010 | Nikovski et al. | |
| 2011/0208787 A1 | 8/2011 | Sidy | |
| 2011/0282734 A1 | 11/2011 | Zurada | |
| 2012/0047014 A1 | 2/2012 | Smadja et al. | |
| 2012/0059859 A1 | 3/2012 | Jiao et al. | |
| 2012/0089903 A1 | 4/2012 | Liu et al. | |
| 2012/0203632 A1* | 8/2012 | Blum | G06Q 30/0255 705/14.53 |
| 2012/0203733 A1 | 8/2012 | Zhang | |
| 2012/0259882 A1 | 10/2012 | Thakur et al. | |
| 2012/0290609 A1 | 11/2012 | Britt | |
| 2012/0303411 A1 | 11/2012 | Chen et al. | |
| 2012/0303758 A1 | 11/2012 | Anbarasan et al. | |
| 2012/0330971 A1* | 12/2012 | Thomas | G06F 17/30663 707/748 |
| 2013/0024282 A1* | 1/2013 | Kansal | G06Q 30/01 705/14.53 |
| 2013/0024525 A1* | 1/2013 | Brady | G06Q 10/08 709/206 |
| 2013/0024924 A1 | 1/2013 | Brady et al. | |
| 2013/0124376 A1 | 5/2013 | Lefebvre et al. | |
| 2013/0145255 A1 | 6/2013 | Zheng et al. | |
| 2013/0151631 A1 | 6/2013 | Jensen et al. | |
| 2013/0191723 A1 | 7/2013 | Pappas et al. | |
| 2014/0067633 A1 | 3/2014 | Venkatasubramanian et al. | |
| 2014/0105508 A1* | 4/2014 | Arora | G06K 9/72 382/218 |
| 2014/0189808 A1 | 7/2014 | Mahaffey et al. | |
| 2014/0358814 A1 | 12/2014 | Brady et al. | |
| 2015/0169522 A1 | 6/2015 | Logan et al. | |
| 2015/0235166 A1 | 8/2015 | Brady et al. | |
| 2015/0235301 A1 | 8/2015 | Brady et al. | |
| 2016/0104188 A1 | 4/2016 | Glyman et al. | |
| 2016/0110762 A1 | 4/2016 | Mastierov et al. | |
| 2016/0110763 A1 | 4/2016 | Mastierov et al. | |

OTHER PUBLICATIONS

Written Opinion of the International Searching Authority dated Apr. 7, 2017 in counterpart International Application No. PCT/US2016/067305, filed Dec. 16, 2016.

* cited by examiner

Order Confirmation — 46

Order Date: Dec. 30, 2015
Item(s) Ordered: Lemon Star Premium xPhone...

Ship to:
First Last
1234 5$^{th}$ Street

Total before tax:  $19.99
Estimated tax:     $1.50
Order total:       $21.49

FIG. 5A

Order Confirmation — 48

Order Date: Dec. 30, 2015
Item(s) Ordered: 13oz Crichton Sport... and 4 other items.

Ship to:
First Last
1234 5$^{th}$ Street

Total before tax:  $31.23
Estimated tax:     $0.00
Order total:       $31.23

FIG. 5B

Presentation Of Aggregated Product Purchase Information For Consumer A — 62

| Order Date | Item Description | Price | Merchant | Status |
|---|---|---|---|---|
| May 25, 2011 | Ipod 2 tablet computing device (Order No. 123456) | $499.00 | Apple | Shipped |
| May 23, 2011 | Canon digital camera model no. 712 (Order No. 987654) | $217.99 | Amazon | Ordered |
| May 19, 2011 | Nike running shoes model no. XYZ (Order No. MNZ12ZY) | $113.99 | Nike Store | Delivered |
| May 11, 2011 | "Successful Startups" book by Bill Gates (Order No. 12ABC34) | $14.99 | Amazon | Delivered |

FIG. 6

PURCHASE CONFIRMATION DATA EXTRACTION WITH MISSING DATA REPLACEMENT

CROSS-REFERENCE TO RELATED APPLICATIONS

Under 35 U.S.C. § 119(e), this application claims the benefit of U.S. Provisional Application No. 62/358,289, filed Jul. 5, 2016, the entirety of which is incorporated herein by reference.

Under 35 U.S.C. § 119(e), this application claims the benefit of U.S. Provisional Application No. 62/273,861, filed Dec. 31, 2015, the entirety of which is incorporated herein by reference.

This application also relates to the following co-pending applications: U.S. patent application Ser. No. 13/185,943 (now U.S. Pat. No. 8,844,010), filed Jul. 19, 2011; U.S. patent application Ser. No. 13/349,287, filed Jan. 12, 2012; U.S. patent application Ser. No. 14/457,421, filed Aug. 12, 2014; U.S. patent application Ser. No. 14/684,954, filed Apr. 13, 2015; U.S. patent application Ser. No. 14/684,658, filed Apr. 13, 2015; U.S. patent application Ser. No. 14/519,919, filed Oct. 21, 2014; U.S. patent application Ser. No. 14/519,975, filed Oct. 21, 2014; and International Patent Application No. PCT/US15/56013, filed Oct. 16, 2015.

BACKGROUND

People purchase products from many different merchants using a variety of different payment options. The transactions for these purchases typically are confirmed by physical in-store receipts or by electronic confirmation messages that are addressed to the purchasers' messaging accounts (e.g., a purchaser's electronic mail account). The large number and diversity of confirmation messages makes it difficult for people to track their purchases and obtain a comprehensive understanding of their purchase histories. In addition, the large diversity of merchants from which people purchase products makes it difficult for merchants to obtain sufficient purchase history data to develop accurate customer profiles. Even assuming that a person uses a common identifier (e.g., a loyalty card or credit card) for all his or her purchases, these purchases typically are tracked only by the merchant that issued the identifier to the customer. This lack of customer information limits a merchant's ability to effectively target its promotions in ways that will encourage them to purchase the merchant's product offerings.

In an effort to ameliorate these problems, reporting systems have been developed to extract purchase related information from data sources that are published directly by merchants to consumers, such as purchase confirmation messages and shipping confirmation messages. However, these data extraction approaches breakdown if merchants fail to provide complete purchase transaction information to the consumers in one or more of such direct publishing channels. As a result, these systems are unable to provide complete cross-merchant purchase transaction information without requiring consumers to open membership accounts with all the merchants with which they shop and to further provide the reporting system with access to those accounts.

SUMMARY

In one aspect, the invention features a computer-implemented method of a purchase transaction data retrieval system. In accordance with this method, over a first network connection with a first network node, a server system associated with the purchase transaction data retrieval system retrieves purchase transaction records. The server system automatically extracts from ones of the purchase transaction records respective sets of purchase transaction related data values for respective target purchase-related field types. The server system automatically flags respective ones of the sets of purchase transaction related data values comprising one or more respective incomplete purchase-related data values for one or more of the target purchase-related field types, and stores the flagged sets of purchase transaction related data values and ones of the other sets of purchase transaction related data values determined to be complete in a data storage system. For each of respective ones of the flagged sets of purchase transaction related data values in the data storage system: the server system determines a query and at least one query result selection criterion based on one or more of the extracted data values in the flagged set; over a second network connection with a second network node, based on the query, the server system obtains respective query results comprising a ranked listing of product-related items each associated with data values for respective purchase-related field types; the server system selects a product-related item in the ranked listing based on the at least one query result selection criteria; the server system excerpts from the respective query results a respective data value for at least one of the one or more target purchase-related field types associated with the selected product-related item in the query results; and the server system loads the at least one excerpted data value and ones of the extracted purchase-related-transaction values in the respective flagged set in the data storage system. The server system transmits data for displaying a view on purchase transaction related data values in the data storage system to a client network node.

The invention also features apparatus operable to implement the method described above and computer-readable media storing computer-readable instructions causing a computer to implement the method described above.

DESCRIPTION OF DRAWINGS

FIG. 5A is a diagrammatic view of an order confirmation message for a single-item purchase transaction.

FIG. 5B is a diagrammatic view of an order confirmation message for a multi-item purchase transaction.

FIG. 6 is a diagrammatic view of an example of a graphical user interface presenting aggregated purchase transaction information.

DETAILED DESCRIPTION

Figure 1:
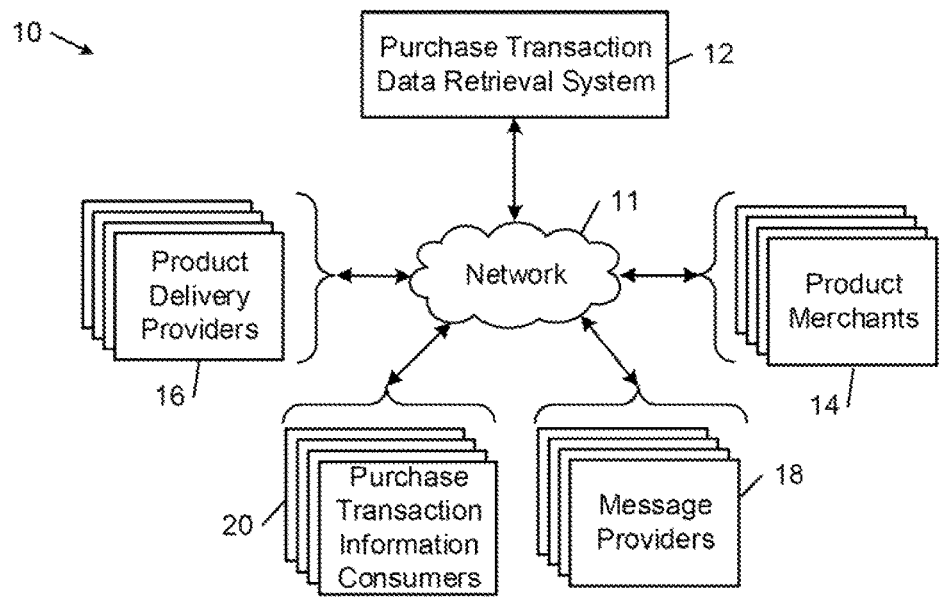
FIG. 1 is a diagrammatic view of an example of a network communication environment.

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

1. Definition of Terms

A "product" is any tangible or intangible good or service that is available for purchase or use.

"Purchase transaction information" (also referred to as "purchase transaction data") is information related to the purchase of a product. Purchase transaction data includes, for example, invoice data, purchase confirmation data (also referred to as "receipt data"), product order information (e.g., merchant name, order number, order date, product description, product name, product quantity, product price, sales tax, shipping cost, and order total), and product shipping information (e.g., billing address, shipping company, shipping address, estimated shipping date, estimated delivery date, and tracking number).

An "electronic message" is a persistent text based information record sent from a sender to a recipient between physical network nodes and stored in non-transitory computer-readable memory. An electronic message may be structured message (e.g., a hypertext markup language (HTML) message that includes structured tag elements) or unstructured (e.g., a plain text message).

A "computer" is any machine, device, or apparatus that processes data according to computer-readable instructions that are stored on a computer-readable medium either temporarily or permanently. A "computer operating system" is a software component of a computer system that manages and coordinates the performance of tasks and the sharing of computing and hardware resources. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" (also referred to as "memory") refers to any tangible, non-transitory device capable storing information (e.g., instructions and data) that is readable by a machine (e.g., a computer). Storage devices suitable for tangibly embodying such information include, but are not limited to, all forms of physical, non-transitory computer-readable memory, including, for example, semiconductor memory devices, such as random access memory (RAM), EPROM, EEPROM, and Flash memory devices, magnetic disks such as internal hard disks and removable hard disks, magneto-optical disks, DVD-ROM/RAM, and CD-ROM/RAM.

A "network node" is a physical junction or connection point in a communications network. Examples of network nodes include, but are not limited to, a terminal, a computer, and a network switch. A "server system" includes one or more network nodes and responds to requests for information or service. A "client node" is a network node that requests information or service from a server system.

As used herein, the term "includes" means includes but not limited to, the term "including" means including but not limited to. The term "based on" means based at least in part on.

2. Purchase Transaction Data Retrieval System with Unobtrusive Side Channel Data Recovery A. Introduction The following specification describes examples of improved systems and methods for obtaining purchase transaction information based on electronic messages that solve practical problems that have arisen from changes in merchant purchase transaction reporting practices resulting in the omission of certain critical product specific information from the electronic confirmation messages that they send to their customers. These examples provide a purchase transaction data retrieval system that is able to unobtrusively obtain missing purchase transaction information from one or more side channels and combine that information with information extracted from electronic messages to provide actionable information across a wider variety of purchase transactions and merchants than otherwise would be possible using conventional approaches.

The resulting purchase transaction information can be aggregated to provide individuals with enhanced tools for visualizing and organizing their purchase histories and to provide merchants and other organizations improved cross-merchant purchase graph information across different consumer demographics to enable targeted and less intrusive advertising and other marketing strategies. These improved systems and methods can be deployed to monitor consumer purchases over time to obtain updated purchase history information that can be aggregated for an individual consumer or across many consumers to provide actionable information that directs consumer behavior and organizational marketing strategies. For example, these improved systems and methods can organize disparate purchase transaction information into actionable data that can be used by a consumer to organize her prior purchases and enhance her understanding of her purchasing behavior and can be used by merchants and other organizations to improve the accuracy and return-on-investment of their marketing campaigns.

B. Exemplary Operating Environment

FIG. 1 shows an example of a network communications environment 10 that includes a network 11 that interconnects a purchase transaction data retrieval system 12, one or more product merchants 14 that sell products, one or more product delivery providers 16 that deliver purchased products to purchasers, one or more message providers 18 that provide message handling services, and one or more purchase transaction information consumers 20 that purchase product and market information and services from the purchase transaction data retrieval system 12.

The network 11 may include any of a local area network (LAN), a metropolitan area network (MAN), and a wide area network (WAN) (e.g., the internet). The network 11 typically includes a number of different computing platforms and transport facilities that support the transmission of a wide variety of different media types (e.g., text, voice, audio, and video) between network nodes of a purchase transaction data retrieval system 12, one or more product merchants 14, product delivery providers 16, message providers 18, and purchase transaction information consumers 20. Each of the purchase transaction data retrieval system 12, the product merchants 14, the product delivery providers 16, the message providers 18, and the purchase transaction information consumers 20 typically connects to the network 11 via a network node (e.g., a client computer or server system) that includes a tangible computer-readable memory, a processor, and input/output (I/O) hardware (which may include a display).

One or more of the product merchants 14 typically allow individuals and businesses to purchase products directly over the network 11 using a network enabled software application, such as a web browser. One or more of the product merchants 14 also may allow individuals and businesses to purchase products in a physical retail establishment. In either case, after a purchase transaction has been completed, a product merchant 14 may send a product purchase confirmation electronic message to a messaging address associated with the product purchaser. The product purchase confirmation message may include, for example, product order information such as merchant name, order number, order date, estimated delivery date, product description, product name, product quantity, product price, sales tax, shipping cost, and order total. The product merchant 14 also may arrange to have the product delivered by one of the product delivery providers 16. Depending on the type of product that was purchased, the product delivery provider 16 may deliver the product to the purchaser physically or electronically. In either case, the product delivery provider 16 or the product merchant 14 may send a delivery notification electronic message to the messaging address associated with the purchaser. The delivery notification electronic message may include, for example, product shipping information such as product order information, billing address, shipping company, shipping address, estimated shipping date, estimated delivery date, and tracking number.

In general, the purchaser's messaging address may be any type of network address to which electronic messages may be sent. Examples of such messaging addresses include electronic mail (e-mail) addresses, text messaging addresses (e.g., a sender identifier, such as a telephone number or a user identifier for a texting service), a user identifier for a social networking service, and a facsimile telephone number. The product purchase related electronic messages typically are routed to the purchaser through respective ones of the message providers 18 associated with the purchaser's messaging address. The message providers 18 typically store the purchasers' electronic messages in respective message folder data structures in a database.

The purchase transaction data retrieval system 12 extracts purchase transaction information from the electronic messages of product purchasers. In some examples, the purchase transaction data retrieval system obtains authorization from the product purchasers to access their respective message folders that are managed by the message providers 18. In other examples, product purchasers allow the purchase transaction data retrieval system 12 to access their electronic messages that are stored on their local communication devices (e.g., personal computer or mobile phone).

Figure 2:
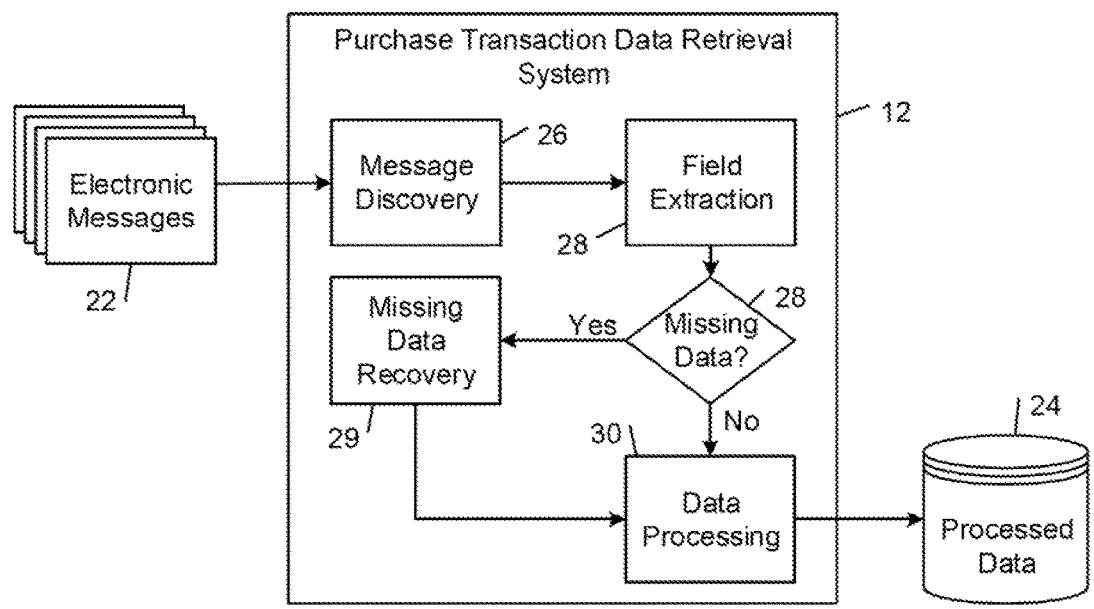
FIG. 2 is a diagrammatic overview of electronic message processing stages performed by an example of a purchase transaction data retrieval system.

C. Retrieving Purchase Transaction Data with Unobtrusive Side Channel Data Recovery 1. Overview Referring to FIG. 2, after obtaining authorization to access the electronic messages 22 of a product purchaser (also referred to herein as a "user"), the purchase transaction data retrieval and provisioning service 12 accesses the product purchaser's electronic messaging account and processes selected ones of the electronic messages 22 that relate to purchase transactions. The purchase transaction data retrieval and provisioning service 12 includes a number of stages for retrieving and processing the electronic messages 22 before producing processed data 24 that may be provided to the purchase transaction information consumers 20. These stages include a message discovery stage 26, a field extraction stage 28, a missing data recovery stage 29, and a data processing stage 30. In some examples, the electronic message processing method of FIG. 2 is performed by a server system that is associated with the purchase transaction data retrieval and provisioning service 12.

In the message discovery stage 26, the purchase transaction data retrieval and provisioning system 12 identifies the particular ones of the electronic messages 22 that relate to purchase transactions. In some examples, rule-based filters and machine learning classifiers are used to identify purchase transaction related electronic messages (see, e.g., the examples described in U.S. patent application Ser. No. 13/185,943, filed Jul. 19, 2011, U.S. patent application Ser. No. 13/349,287, filed Jan. 12, 2012, U.S. patent application Ser. No. 14/519,919, filed Oct. 21, 2014, and U.S. patent application Ser. No. 14/519,975, filed Oct. 21, 2014).

In the field extraction stage 28, the purchase transaction data retrieval and provisioning service 12 extracts purchase transaction information from the identified ones of the electronic messages 22. Examples of such purchase transaction information include merchant name, order number, order date, product description, product name, product quantity, product price, sales tax, shipping cost, order total, billing address, shipping company, shipping address, estimated shipping date, estimated delivery date, and tracking number. A variety of different methods may be used to extract purchase transaction information from the identified ones of the electronic messages 22 (see, e.g., the examples described in U.S. patent application Ser. No. 13/185,943, filed Jul. 19, 2011, U.S. patent application Ser. No. 13/349, 287, filed Jan. 12, 2012, U.S. patent application Ser. No. 14/519,919, filed Oct. 21, 2014, and U.S. patent application Ser. No. 14/519,975, filed Oct. 21, 2014).

In the missing data recovery stage 29, the purchase transaction data retrieval and provisioning service 12 identifies information that is missing from the extracted purchase transaction information and attempts to recover some or all of the identified missing information. Examples of these processes are described in detail below.

In the data processing stage 30, the purchase transaction data retrieval and provisioning service 12 combines the extracted and recovered purchase transaction information to produce processed data 24 that includes, for example, aggregated data and views on the aggregated data. Various views on the aggregated data may be prepared for different types of purchase transaction information consumers 20. For individual users, the extracted purchase transaction information is processed, for example, to display information about the users' purchases, including information for tracking in-transit orders, information for accessing purchase details, and aggregate purchase summary information. For advertisers, the extracted purchase transaction information is processed, for example, to assist in targeting advertising to consumers based on their purchase histories. For market analysts, the extracted purchase transaction information is processed to provide, for example, anonymous item-level purchase detail across retailers, categories, and devices.

2. Side Channel Data Recovery

Many merchants send their customers confirmation messages that include sufficient purchase transaction information to generate the types of reports desired by the purchase transaction information consumers 20. Other merchants, however, have changed their purchase transaction reporting practices so that the confirmation messages that they transmit to their customers no longer include complete purchase transaction information for particular purchase transaction data field types. (These types of confirmation messages are referred to herein as "limited data order confirmation messages.") Without this information, conventional confirmation message based data extraction systems are unable to obtain the information needed to provide complete cross-merchant purchase transaction information without requiring consumers to have registered accounts with all the merchants with which they shop and to further provide the reporting system with access to those accounts. For example, in order to derive many types of the purchase transaction information products, the purchase transaction information provider 12 needs information that allows it to accurately identify (or at least categorize) individual purchased products and accurately determine the prices paid for those individual products. Limited data order confirmation messages, however, do not contain complete product description information and/or individual product price information and, as a result, conventional approaches do not use purchase transaction information from limited data order confirmation messages to generate their purchase transaction reports.

Figure 3:
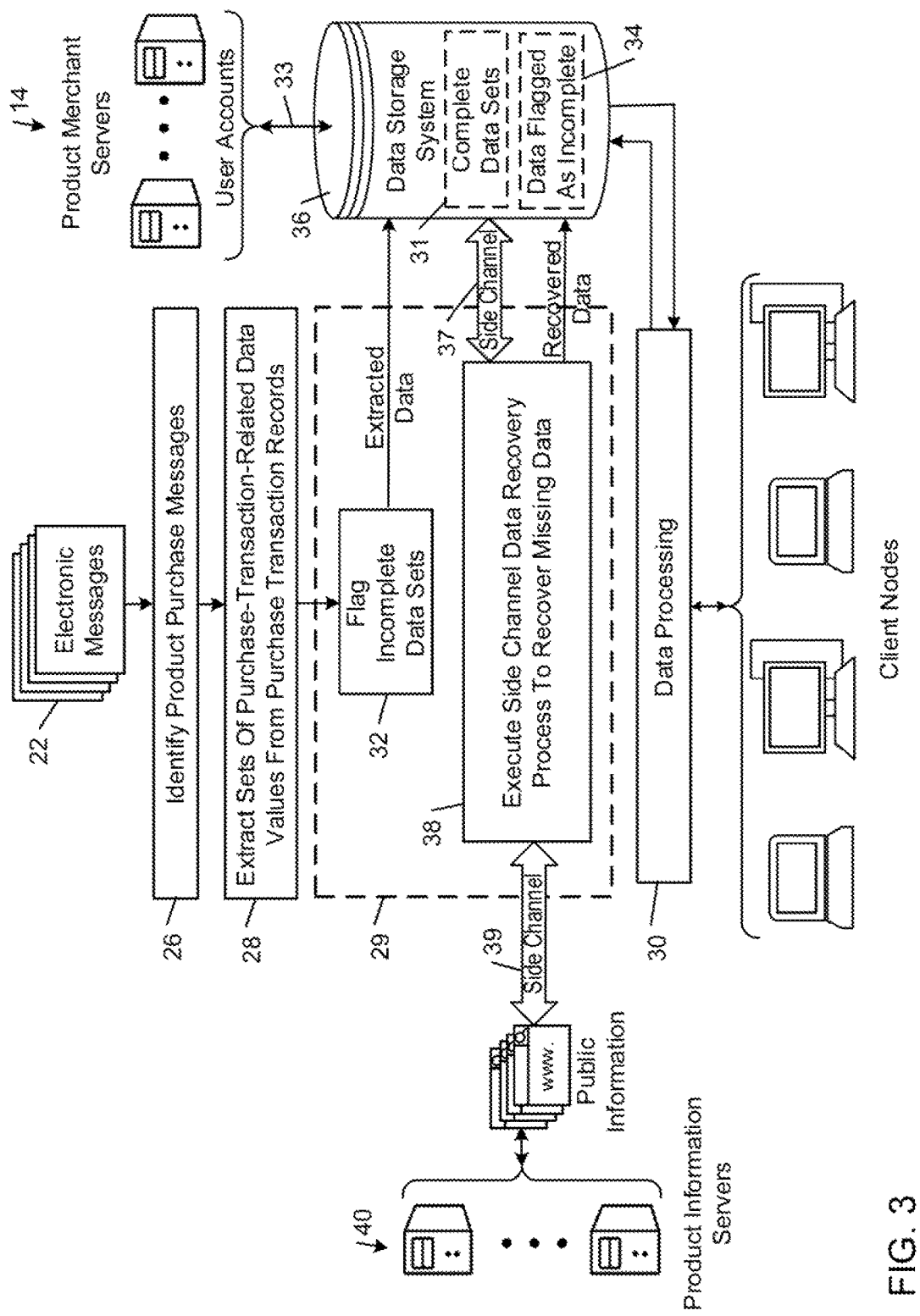
FIG. 3 is a diagrammatic detailed view of an electronic message based purchase transaction retrieval process performed by an example of a purchase transaction data retrieval system.

FIG. 3 shows an example of the process of FIG. 2 in which the data recovery stage 29 has been expanded to show processes for unobtrusively recovering missing purchase transaction information from one or more side channels to mitigate the data omission problem associated with limited data order confirmation messages.

Referring to FIG. 3, in the message discovery and field extraction processing stages 26, 28, the purchase transaction data retrieval and provisioning service 12 extracts respective sets of purchase transaction related data values for respective target purchase-related field types from identified ones of the users' electronic messages (FIG. 3, blocks 26 and 28). Each set of purchase transaction related data values typically is stored as a respective database record, which may be indexed by the order number of the associated purchase transaction.

Based on the extracted information, the purchase transaction data retrieval and provisioning service 12 flags respective ones of the sets of purchase transaction related data values that include one or more incomplete purchase-related data values for one or more of the target purchase-related field types (FIG. 3, block 32). The flagged data value sets typically correspond to the purchase transaction related data value sets that are extracted from limited data order confirmation messages. In some examples, the purchase transaction data retrieval and provisioning system 12 only flags those sets of purchase transaction related data values that have incomplete or no information for one or more key purchase-related field types (e.g., product description, product price, and product quantity).

In some examples of the flagging process (FIG. 3, block 32), the purchase transaction data retrieval system 12 automatically scans each set of extracted purchase transaction related data values for an incomplete data value marker in one or more key purchase-related field types. Examples of an incomplete data value marker include an indication that an extracted product description text data value for the product description field is incomplete. Examples of such indications include the presence of an ellipsis (e.g., " . . . ") or other symbol (e.g., a dash, such as "-") in the extracted product description text in the product description field, and the presence of an indication in the product description field that the respective purchase transaction relates to one or more unspecified other items (e.g., the product description text includes an explicit reference to "other items").

In some examples, in addition to extracting purchase transaction related data values from electronic messages 22, the purchase transaction data retrieval and provisioning service 12 also extracts complete sets of purchase transaction related data values from users' purchase history records that are stored in the users' customer accounts that are maintained by the merchants 14 with which the users shop.

In these examples, users of the purchase transaction data retrieval system 12 provide their authentication credentials (e.g., username and password) for their customer accounts with one or more of the merchants 14 with which they shop to allow the purchase transaction data retrieval system 12 to retrieve complete sets of purchase transaction data from the users' purchase history records that are stored in association with their customer accounts with respective ones of the merchants 14.

The purchase transaction data retrieval service 12 stores the extracted sets 31 of purchase transaction related data values that are determined to be complete and the extracted sets 34 of purchase transaction related data values that are flagged as incomplete in a data storage system 36. In some examples, the purchase transaction data retrieval system 12 stores the sets of purchase transaction related data values that are flagged as incomplete in a recovery data store, and loads ones of the other sets of purchase transaction related data values that are determined to be complete as structured data in a data warehouse. The recovery data store serves as a temporary repository for the flagged data sets and may be organized as a database or a flat file. The data warehouse, on the other hand, serves as a central repository for purchase transaction data that supports various analysis and reporting functions. In some examples, structured data is loaded into the data warehouse using extract-transform-load (ETL) based data warehousing techniques.

The purchase transaction data retrieval system 12 executes one or more side channel data recovery processes to retrieve data that is missing from the respective incomplete sets of purchase transaction related data values stored in the recovery data store (FIG. 3, block 38).

In a first party side channel data recovery process 37, the purchase transaction data retrieval system 12 attempts to recover some or all of the missing data from respective ones of the complete sets 31 of purchase transaction related data values stored in the data storage system 36. In this regard, the purchase transaction data retrieval system 12 attempts to recover missing data from the complete sets 31 of purchase transaction data that the purchase transaction data retrieval system 12 extracts from the electronic messages 22 and from users' purchase history records that are retrieved from the users' customer accounts with respective ones of the merchants 14.

In a third party side channel data recovery process 37, the purchase transaction data retrieval system 12 attempts to recover some or all of the missing data from third party data maintained on one or more product information servers 40. In some examples, the third party data includes publically available databases (e.g., product catalogues) that are maintained by the product information servers 40 of product merchants 14, online shopping aggregators, and other online sources of product information.

In the data processing stage 30, the purchase transaction data retrieval 12 combines the extracted and recovered purchase transaction information to produce processed data 24 that includes, for example, aggregated data and views on the aggregated data. Either automatically or responsive to requests from the client network nodes 20, the purchase transaction data retrieval system 12 transmits the processed data 24 to the client network nodes 20 for displaying respective views on the aggregated data.

Figure 4:
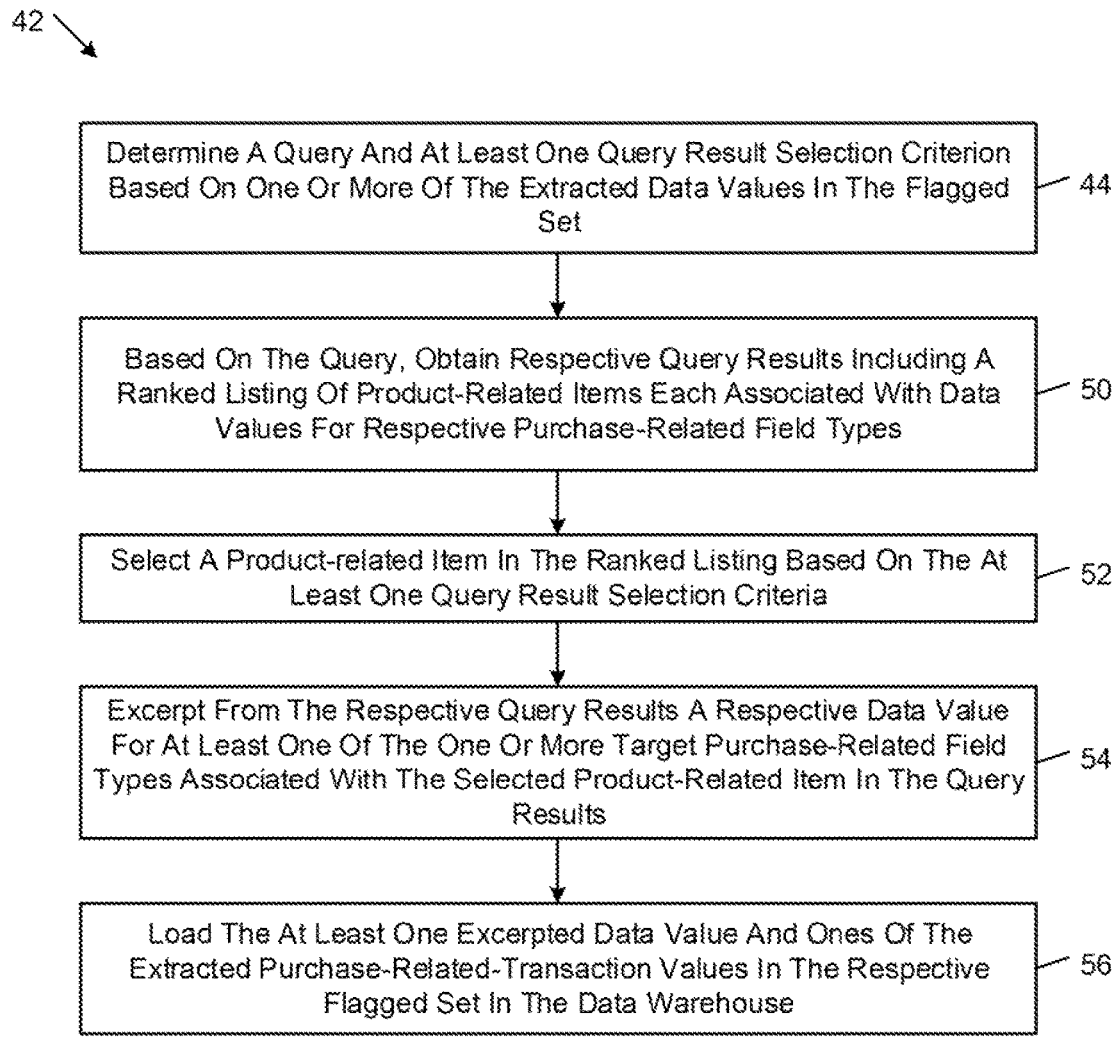
FIG. 4 is a flow diagram of an example of a side channel data recovery process performed by an example of a purchase transaction data retrieval system.

FIG. 4 shows an example of a side channel data recovery process 42 that involves applying the following processing stages to ones of the flagged sets of purchase transaction related data values in the data storage system 36.

In accordance with the side channel data recovery process 42, the purchase transaction data retrieval system 12 determines a query and at least one query result selection criterion based on one or more of the extracted data values in the flagged set (FIG. 4, block 44). The particular contents of the query and the query result selection criterion typically are determined based on one or more of the extracted data values in the flagged data value set or the missing information to be recovered, or both the extracted data value information and the missing information.

Some examples are designed to identify a product purchased in a purchase transaction based on an incomplete product description that was extracted from a purchase transaction record. In these examples, the purchase transaction data retrieval system 12 incorporates, at least in part, the extracted incomplete description of the purchased product into the query. In some of these examples, the query also may include a product model number, product feature information, a merchant identifier, and other ancillary product-related information that was extracted from the associated purchase transaction record. In some of these examples, the query result selection criteria include an extracted price paid (e.g., order subtotal price) for the product corresponding to the extracted incomplete product description. The query result selection criteria also may include a timeliness requirement to ensure that the missing information is recovered from data that is contemporaneous or nearly contemporaneous (e.g., within a specified number of weeks or months) with the date of the purchase transaction (as reflected, for example, by the order date or the confirmation message date). The query result selection criteria also may include one or more heuristics to select a particular product from a listing of potentially matching products.

Some examples are designed to identify a product purchased in a purchase transaction and a price paid for that product based on an incomplete product description and one or more price data values that were extracted from a purchase transaction record. In these examples, the purchase transaction data retrieval system 12 incorporates the extracted incomplete description of the purchased product into the query. In some of these examples, the query also may include a product model number, product feature information, a merchant identifier, and other ancillary product-related information that was extracted from the associated purchase transaction record. In some of these examples, the query result selection criteria include one or more of the following: price constraints that are derived from one or more extracted price data values to narrow the list of similar product descriptions; a timeliness requirement to ensure that the missing information is recovered from data that is contemporaneous or nearly contemporaneous (e.g., within a specified number of weeks or months) with the date of the purchase transaction (as reflected, for example, by the order date or the confirmation message date); and one or more heuristics to select a particular product from a listing of potentially matching products.

In some examples, the purchase transaction data retrieval system 12 automatically determines upper and lower product price bounds for selecting the product-related item in the respective query results based on a first price data value for a subtotal field type and a second price data value for an order total field type, and optionally based on one or more item quantity data values extracted from the respective purchase transaction record.

In some of these examples, the upper price bound is set to the extracted order total price value.

In examples in which the order subtotal price value is greater than zero, the lower price bound is derived from a scaling of the order subtotal price value by a factor dependent on a linear function of the one or more item quantity data values extracted from the respective purchase transaction record. In some examples, the scaling factor is given by equation (1):

$$\frac{a}{\text{quantity of first item} + b \cdot (\text{quantity of other items})} \quad (1)$$

where the variables a and b are empirically determined constants.

In examples in which the order subtotal price value is zero, the lower price bound is derived from a scaling of the order total price value by a factor dependent on a linear function of the one or more item quantity data values extracted from the respective purchase transaction record. In some examples, the scaling factor is given by equation (1) where one or both of the empirically determined constants a and b may be same or different from the values used for the examples described above in which the order subtotal price value is greater than zero.

FIGS. 5A and 5B show exemplary purchase transaction records 46, 48 from which the purchase transaction data retrieval system 12 generates respective query terms and respective query result selection criteria.

FIG. 5A shows an example of a single-item purchase transaction record 46 that provides a partial description (i.e., "Lemon Star Premium xPhone") of the purchased product, a quantity ("1" is implied) of the purchased product, and a price (i.e., $19.99) of the purchased product. In this example, the incomplete description of the purchased product prevents the purchase transaction data retrieval system 12 from directly identifying the product purchased. In this case, the purchase transaction data retrieval system 12 generates a query that includes the extracted partial description of the purchased product, and generates a query result selection criterion that includes the extracted purchased product price as the upper price bound.

FIG. 5B shows an example of a multi-item purchase transaction record 48 that provides the quantity ("1" is implied) and a partial product description (i.e., "13 oz Crichton Sport") of the first purchased product listed, the quantity (i.e., "4") of "other items" purchased, the total price of the items before tax (i.e., $31.23), and the order total (i.e., $31.23). In this example, the purchase transaction data retrieval system 12 is unable to directly identify the first purchased product listed, cannot directly identify any of the "other items" that were purchased, and cannot directly determine the prices paid for any of the purchased products. In this case, the purchase transaction data retrieval system 12 generates a query that includes the extracted partial description of the first purchased product listed, and generates query result selection criteria that includes the extracted order total (i.e., $31.23) as the upper price bound and lower price bound derived from a scaling of the order subtotal price value (i.e., $31.23) by the factor defined in equation (1).

Referring back to FIG. 4, based on the query, the purchase transaction data retrieval system 12 obtains respective query results that include a respective listing of one or more product-related items each of which is associated with data values for respective purchase-related field types (FIG. 4, block 50). The query results may be obtained from a server in the form of at least one document, which may be structured (e.g., an HTML formatted a web page) or unstructured (e.g., a plain text document). In some examples, the listing of product-related items is ranked by one or more factors (e.g., sales volume, sales rank, product views, product reviews, product newness, and conversion ratio).

In some examples, the purchase transaction data retrieval system 12 submits the query to a database search engine that is associated with the data storage system 36 to search for records of respective ones of the complete sets 31 of purchase transaction related data values stored in the data storage system 36 that include data values that are similar to corresponding data values in the query. In some examples, the search is limited to records that satisfy a timeliness requirement. In response to the query submission, the database search engine returns a ranked listing of product-related items (i.e., query results) having one or more data values that are similar to the terms of the query. The listing may be ranked based on one or more factors, including degree of match with the query terms, product popularity, and degree to which the timeliness requirement is satisfied. In some examples, the product popularity is determined from an analysis of purchase transaction data obtained from one or more of the data storage system 36 and other sources (e.g., one or more online commerce companies). In some examples, the product-related items in the listing are ranked based on the degree of closeness of their respective order dates to the order date of the purchase transaction that is the subject of the search.

In some examples, the purchase transaction data retrieval system 12 submits the query to one or more database search engines associated with respective third-party databases (e.g., publicly available product catalogues published by the servers 40 of product merchants or other online publishers of product information) to search for product-related items with data values that are similar to corresponding data values in the query. In some examples, the purchase transaction data retrieval system 12 identifies the merchant associated with the flagged data set and submits the query to a database search engine associated with the identified merchant. In some examples, the database search engine is executed on a web server and the purchase transaction data retrieval system 12 automatically enters the query into a graphical control element of a web page generated by the web server. In response to the query, the database search engine returns a query results document (e.g., a web page) that includes a ranked listing of product-related items having one or more data values that are similar to the terms of the query. The listing may be ranked based on one or more factors, including degree of match with the query terms, product popularity, and degree to which the timeliness requirement is satisfied. In some examples, the database search engine automatically ranks the product-related item listing by product popularity.

In some examples, the purchase transaction data retrieval system 12 combines the results of multiple searches obtained from one or multiple database search engines to produce a single query results listing.

In some examples, the purchase transaction data retrieval system 12 automatically parses a query results document before analyzing the search results. In some of these examples, the purchase transaction data retrieval system 12 parses the query results document using one or more automated web scraping processes that are specific to the format of the query results document to obtain a parsed results listing that includes a respective set of semantically labeled data values for one or more items in the query results document.

Referring back to FIG. 4, the purchase transaction data retrieval system 12 selects a product-related item in the ranked listing based on the at least one query result selection criterion (FIG. 4, block 52). As explained above, the query result selection criteria may include one or more price constraints (e.g., upper and lower price bounds), a timeliness requirement, and one or more heuristics. These criteria are used to generate a set of rules for selecting a particular product-related item in the ranked listing from which to recover the missing information.

The following are examples of item selection rules that are used to select a particular product-related item from a ranked listing of items for which there is an exact string match between an extracted partial product description and one or more product descriptions in the ranked item listing:

If there is only a single item that contains an exact string match with the partial product description, select that item.

If there are multiple items that contain exact string matches, apply the first of the following selection rules that is satisfied:

select the first item in the listing that has an item price between the upper price bound and the lower price bound;

select the first item in the listing that has an item price that is lower than the upper price bound;

if there are no items in the listing with a price that is lower than the upper price bound, select the first item in the listing;

if the order total in the associated transaction record is $0.00, select the first item in the listing.

After selecting a product-related item in the ranked listing, the purchase transaction data retrieval system 12 excerpts from the respective query results a respective data value for at least one of the one or more target purchase-related field types associated with the selected product-related item in the query results document (FIG. 4, block 54). In this process, the purchase transaction data retrieval system 12 may excerpt the at least one data value either directly from the ranking listing or indirectly from a parsed version of the ranked listing.

The purchase transaction data retrieval system 12 loads the at least one excerpted data value and ones of the extracted purchase-related-transaction values in the respective flagged set as structured data in the data warehouse (FIG. 4, block 56). In some examples, this process is performed using extract-transform-load (ETL) based data warehousing techniques.

As explained above, a partial product description is provided in single-item limited data order confirmation messages (see FIG. 5A) and a partial product description is provided for the first of multiple products in multi-item limited data order confirmation messages. The above-described side-channel data recovery processes have a high likelihood of accurately recovering missing product description information and missing price information based on partial product descriptions and extracted price selection criteria. The products corresponding to single item orders and the first listed products in multi-item orders represent a substantial proportion of the products purchased in online purchase transactions. Consequently, the above-described side-channel data recovery processes significantly increase the amount of actionable data that can be determined from limited data order purchase transaction confirmation messages as compared to conventional message-based data extraction approaches.

D. Views on Aggregated Purchase Transaction Data

The extracted purchase transaction information may be used in a wide variety of useful and tangible real-world applications. For example, for individual users, the extracted purchase transaction information is processed, for example, to display information about the users' purchases, including information for tracking in-transit orders, information for accessing purchase details, and aggregate purchase summary information. For advertisers, the extracted purchase transaction information is processed, for example, to assist in targeting advertising to consumers based on their purchase histories. For market analysts, the extracted purchase transaction information is processed to provide, for example, anonymous item-level purchase detail across retailers, categories, and devices.

FIG. 6 shows an example of a graphical user interface 62 presenting a set of purchase transaction information for a particular consumer (i.e., Consumer A). In this example, purchase transaction information for a set of products purchased by Consumer A is present by product in reverse chronological order by order date to provide the purchase history for Consumer A. The purchase transaction information includes Order Date, Item Description, Price, Merchant, and Status. This presentation of purchase transaction information allows Consumer A to readily determine information about the products in the purchase history, such as prices paid and delivery status. In this way, Consumer A is able to readily determine what he bought, where he bought it, and when it will arrive without having to review the original electronic messages (e.g., e-mail messages) containing the purchase transaction information.

Other exemplary applications of the aggregated purchase transaction information are described in, for example, U.S. Patent Publication No. 20130024924 and U.S. Patent Publication No. 20130024525.

E. Exemplary Computer Apparatus

Computer apparatus are specifically programmed to provide improved processing systems for performing the functionality of the methods described herein.

Figure 7:
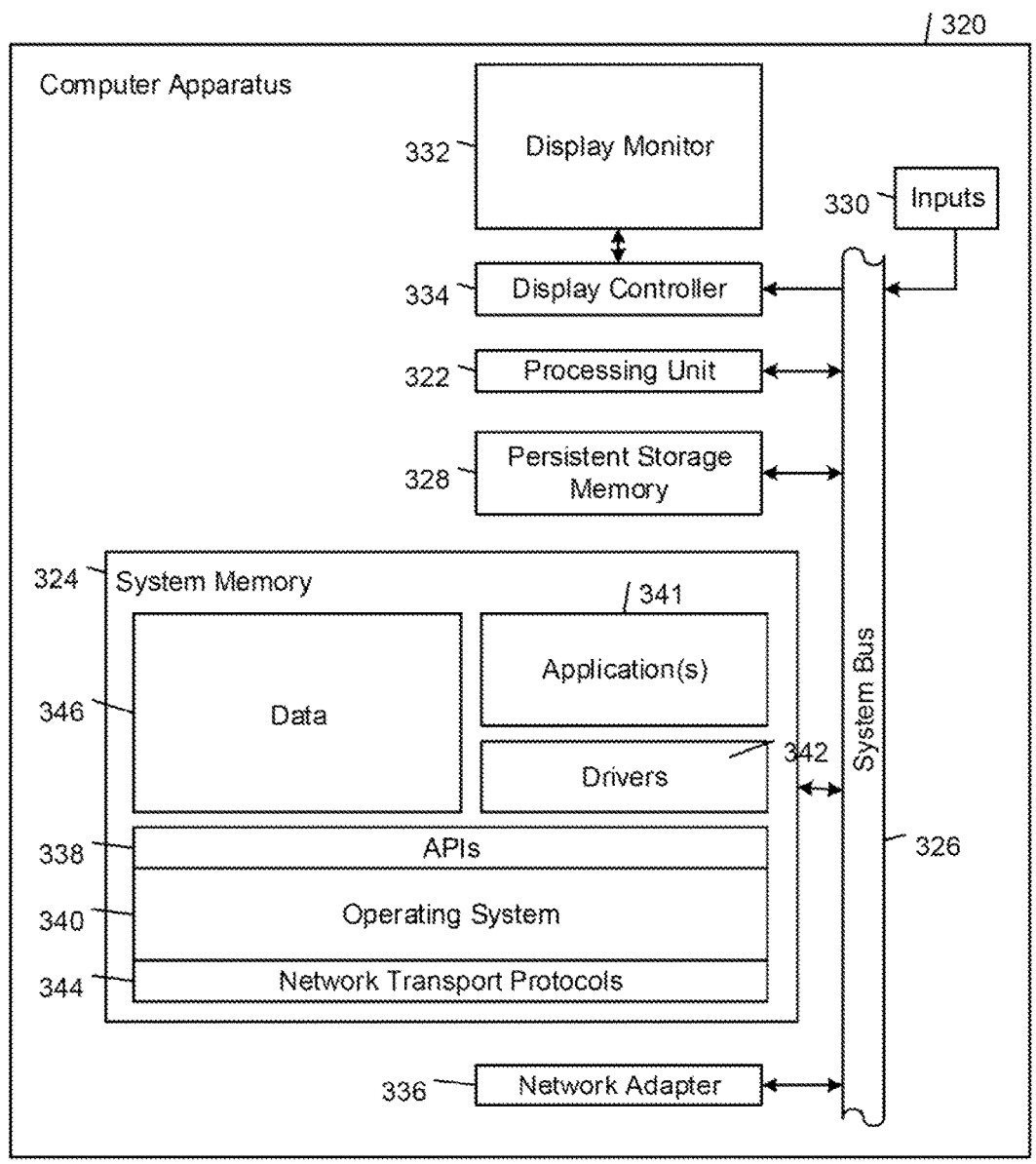
FIG. 7 is a block diagram of an example of computer apparatus.

FIG. 7 shows an exemplary embodiment of computer apparatus that is implemented by a computer system 320. The computer system 320 includes a processing unit 322, a system memory 324, and a system bus 326 that couples the processing unit 322 to the various components of the computer system 320. The processing unit 322 may include one or more data processors, each of which may be in the form of any one of various commercially available computer processors. The system memory 324 includes one or more computer-readable media that typically are associated with a software application addressing space that defines the addresses that are available to software applications. The system memory 324 may include a read only memory (ROM) that stores a basic input/output system (BIOS) that contains start-up routines for the computer system 320, and a random access memory (RAM). The system bus 326 may be a memory bus, a peripheral bus or a local bus, and may be compatible with any of a variety of bus protocols, including PCI, VESA, Microchannel, ISA, and EISA. The computer system 320 also includes a persistent storage memory 328 (e.g., a hard drive, a floppy drive, a CD ROM drive, magnetic tape drives, flash memory devices, and digital video disks) that is connected to the system bus 326 and contains one or more computer-readable media disks that provide non-volatile or persistent storage for data, data structures and computer-executable instructions.

A user may interact (e.g., input commands or data) with the computer system 320 using one or more input devices 330 (e.g. one or more keyboards, computer mice, microphones, cameras, joysticks, physical motion sensors, and touch pads). Information may be presented through a graphical user interface (GUI) that is presented to the user on a display monitor 332, which is controlled by a display controller 334. The computer system 320 also may include other input/output hardware (e.g., peripheral output devices, such as speakers and a printer). The computer system 320 connects to other network nodes through a network adapter 336 (also referred to as a "network interface card" or NIC).

A number of program modules may be stored in the system memory 324, including application programming interfaces 338 (APIs), an operating system (OS) 340 (e.g., the Windows® operating system available from Microsoft Corporation of Redmond, Wash. U.S.A.), software applications 341 including one or more software applications programming the computer system 320 to perform one or more of the functions of the purchase transaction data retrieval system 12, drivers 342 (e.g., a GUI driver), network transport protocols 344, and data 346 (e.g., input data, output data, program data, a registry, and configuration settings).

In some embodiments, the services provided by each of the purchase transaction data retrieval and provisioning service 12, the product merchants 14, the product delivery providers 16, and the message providers 18 (see FIG. 1) are performed at least in part by respective server systems that include one or more server network nodes corresponding to the computer apparatus 320.

3. Conclusion

The embodiments described herein provide improved systems, methods, and computer-readable media for unobtrusively retrieving purchase transaction information from multiple sources and combining that information to provide actionable information across a wider variety of different purchase transactions and merchants than otherwise would be available from conventional approaches.

Other embodiments are within the scope of the claims.

The invention claimed is:

1. A method implemented by one or more computing devices specifically programmed to perform operations comprising:
  automatically, by one or more of the computing devices, parsing purchase confirmation messages corresponding to respective purchase transactions to extract sets of structured text strings for respective target purchase-related field types comprising a product description field type and one or more price field types;
  for each of one or more of the extracted sets of structured text strings corresponding to a respective multi-product purchase transaction and comprising a respective partial description text string for a first one of the products and one or more total price text strings for the respective purchase transaction but missing an individual price text string for the first product, by one or more of the computing devices,
    building a respective query as a function of the partial description text string for the first product,
    determining respective upper and lower price bounds for the first product as a function of one or more of the total price text strings for the respective purchase transaction,
    sending at least one request comprising the query to at least one network address that triggers at least one server network node to execute a search engine to return at least one electronic document comprising a respective dynamically generated ranked list of product-related items matching the query and comprising respective sets of descriptions and individual prices for respective products, wherein the product-related items in the list are unconnected to the respective purchase transaction and are derived from at least one of (i) records of purchase transactions other than the respective purchase transaction and (ii) records of products offered for purchase, selecting a product-related item in the ranked list of product-related items by evaluating one or more of the individual product prices in one or more of the product-related items against the respective upper and lower price bounds for the first product and one or more heuristics that preferentially select higher ranked product-related items over lower ranked product-related items, excerpting a respective complete product description text string and a respective individual product price text string from the selected product-related item, and augmenting the extracted set of structured text strings for the respective purchase transaction with the excerpted complete product description text string and the respective individual product price text string; and aggregating, by one or more of the computing devices, the extracted and augmented sets of structured text strings to produce actionable data for visualizing purchase graph information.

2. The method of claim 1, wherein the parsing comprises, by one or more of the computing devices, automatically extracting a subtotal price text string for a subtotal price field type and an order total price text string for an order total price field type; and the determining comprises, by one or more of the computing devices, automatically determining the upper and lower price bounds for selecting the product-related item in the ranked list based on the subtotal price text string and the order total price text string.

3. The method of claim 2, wherein the parsing comprises, by one or more of the computing devices, automatically extracting one or more item quantity text strings from each of respective ones of the purchase confirmation messages; and the determining comprises, by one or more of the computing devices, automatically determining the upper and lower price bounds for the first product based on the one or more item quantity text strings extracted for the respective purchase transaction.

4. The method of claim 2, wherein the selecting comprises: in response to a determination that none of the product-related items in the ranked list has a price lower than the upper price bound, selecting a highest ranked one of the product-related items in the ranked list.

5. The method of claim 2, wherein the selecting comprises: in response to a determination that the order total price text string is zero, selecting a highest ranked one of the product-related items in the ranked list.

6. The method of claim 1, wherein the selecting comprises selecting a highest ranked one of the product-related items in the ranked list that satisfies the respective upper and lower price bounds for the first product.

7. The method of claim 1, wherein the records of purchase transactions other than the respective purchase transaction comprise records of complete ones of the sets of structured text strings extracted for purchase transactions other than the respective purchase transaction.

8. The method of claim 1, wherein for a particular one of the confirmation messages associated with a particular merchant, the sending comprises sending a request comprising the query to at least one network address that triggers at least one server network node to query records of products offered for purchase by the particular merchant.

9. The method of claim 8, wherein the sending comprises automatically, by one or more of the computing devices, entering the query into a graphical control element of a web page generated by a web server associated with the particular merchant, and the at least one electronic document comprising the respective dynamically generated ranked list of product-related items is served in a web page by the web server associated with the particular merchant.

10. The method of claim 1, wherein the excerpting of the respective complete product description text string and the respective individual product price text string is conditional on satisfaction of a predetermined timeliness requirement that the selected product-related data item is associated with a date that is within a specified timeframe of a date associated with the respective purchase transaction.

11. The method of claim 1, further comprising storing incomplete sets of extracted text strings for the respective target purchase-related field types in a recovery data store, and storing complete sets of extracted text strings for the respective target purchase-related field types in a data warehouse.

12. The method of claim 1, wherein the excerpting comprises excerpting the respective complete product description text string and the respective individual product price text string from at least one electronic document.

13. The method of claim 1, wherein the sending comprises applying the query to records of respective ones of the extracted sets of structured text strings determined to be complete.

14. The method of claim 13, wherein the parsing comprises extracting the respective sets of structured text strings from purchase transaction records in respective electronic messages transmitted between network nodes, and the sending comprises applying the query to records of complete ones of the sets of extracted structured text strings.

15. The method of claim 1, wherein:
the parsing comprises, by one or more of the computing devices, automatically extracting from the purchase confirmation messages an order subtotal price text string for an order subtotal price field type and one or more item quantity text strings; and
the determining comprises deriving the lower price bound for the first product by scaling the order subtotal price text string by a factor dependent on a linear function of the one or more item quantity data values extracted from the respective purchase transaction.

16. The method of claim 1, wherein:
the parsing comprises, by one or more of the computing devices, automatically extracting from the purchase confirmation messages an order total price text string for an order total price field type, an order subtotal price text string for an order subtotal price field type, and one or more item quantity text strings; and
in response to a determination that the order subtotal price text string is zero, the determining comprises deriving the lower price bound for the first product by scaling the order total price text string by a factor dependent on a linear function of the one or more item quantity data values extracted from the respective purchase transaction.

17. The method of claim 1, wherein one of the one or more computing devices is the at least one server node.

18. The method of claim 1, wherein the records of products offered for purchase are records of products offered for sale by a merchant associated with the purchase transaction.

19. The method of claim 1, wherein the dynamically generated list of product related items is ranked by product popularity.

20. The method of claim 1, wherein the product related items in the dynamically generated list are associated with respective dates and are ranked by degree of closeness of their respective dates to an order date associated with the respective the purchase transaction.

21. Apparatus comprising a memory storing processor-readable instructions, and a processor coupled to the memory, operable to execute the instructions, and based at least in part on the execution of the instructions operable to perform operations comprising:

automatically parsing purchase confirmation messages corresponding to respective purchase transactions to extract sets of structured text strings for respective target purchase-related field types comprising a product description field type and one or more price field types;

for each of one or more of the extracted sets of structured text strings corresponding to a respective multi-product purchase transaction and comprising a respective partial description text string for a first one of the products and one or more total price text strings for the respective purchase transaction but missing an individual price text string for the first product, building a respective query as a function of the partial description text string for the first product, determining respective upper and lower price bounds for the first product as a function of one or more of the total price text strings for the respective purchase transaction, applying the query to at least one search engine to create a dynamically generated ranked list of product-related items matching the query and comprising respective sets of descriptions and individual prices for respective products, wherein the product-related items in the list are unconnected to the respective purchase transaction and are derived from at least one of (i) records of purchase transactions other than the respective purchase transaction and (ii) records of products offered for purchase, selecting a product-related item in the ranked list of product-related items by evaluating one or more of the individual product prices in one or more of the product-related items against the respective upper and lower price bounds for the first product and one or more heuristics that preferentially select higher ranked product-related items over lower ranked product-related items, excerpting a respective complete product description text string and a respective individual product price text string from the selected product-related item, and augmenting the extracted set of structured text strings for the respective purchase transaction with the excerpted complete product description text string and the respective individual product price text string.

22. A computer-readable data storage apparatus comprising a memory component storing executable instructions that are operable to be executed by a processor, wherein the memory component includes:

executable instructions to automatically parse a purchase confirmation message corresponding to a respective purchase transaction to extract a set of structured text strings for respective target purchase-related field types comprising a product description field type and one or more price field types;

for processing the extracted set of structured text strings corresponding to a respective multi-product purchase transaction and comprising a respective partial description text string for a first one of the products and one or more total price text strings for the respective purchase transaction but missing an individual price text string for the first product, the memory component further includes, executable instructions to build a respective query as a function of the partial description text string for the first product, executable instructions to determine respective upper and lower price bounds for the first product as a function of one or more of the total price text strings for the respective purchase transaction, executable instructions to apply the query to at least one search engine to create a dynamically generated ranked list of product-related items matching the query and comprising respective sets of descriptions and individual prices for respective products, wherein the product-related items in the list are unconnected to the respective purchase transaction and are derived from at least one of (i) records of purchase transactions other than the respective purchase transaction and (ii) records of products offered for purchase, executable instructions to select a product-related item in the ranked list of product-related items by evaluating one or more of the individual product prices in one or more of the product-related items against the respective upper and lower price bounds for the first product and one or more heuristics that preferentially select higher ranked product-related items over lower ranked product-related items, executable instructions to excerpt a respective complete product description text string and a respective individual product price text string from the selected product-related item, and executable instructions to augment the extracted set of structured text strings for the respective purchase transaction with the excerpted complete product description text string and the respective individual product price text string.

* * * * *